United States Patent [19]

Hangebrauck

[11] Patent Number: 4,773,679

[45] Date of Patent: Sep. 27, 1988

[54] PRESSURIZED FLUID COUPLING

[75] Inventor: Calvin G. Hangebrauck, Central, S.C.

[73] Assignee: Anchor Swan, St. Louis, Mo.

[21] Appl. No.: 32,055

[22] Filed: Mar. 27, 1987

[51] Int. Cl.[4] .............................................. F16L 33/20
[52] U.S. Cl. ................................. 285/256; 285/242; 285/259; 29/508
[58] Field of Search ...................... 285/242, 256, 259; 29/507, 508, 517, 237

[56] References Cited

U.S. PATENT DOCUMENTS

| | | | |
|---|---|---|---|
| 1,825,005 | 9/1931 | Loughead | 285/256 |
| 1,962,060 | 6/1934 | Emery, Jr. | 285/256 |
| 2,147,355 | 2/1939 | Scholtes | 285/259 |
| 2,211,008 | 8/1940 | Goldberg | 285/256 X |
| 2,562,116 | 7/1951 | Nelson | 285/259 X |
| 2,623,837 | 12/1952 | Butler | 29/507 |
| 2,634,786 | 4/1953 | Stinchcomb et al. | 29/507 |
| 2,686,066 | 8/1954 | Paquin | 285/256 |
| 2,924,009 | 2/1960 | Mazeika | 29/508 |
| 3,167,334 | 1/1965 | Cline et al. | 285/259 X |
| 4,330,142 | 5/1982 | Paini | 285/256 |

FOREIGN PATENT DOCUMENTS

| | | | |
|---|---|---|---|
| 10641 | of 1891 | United Kingdom | 285/256 |
| 688699 | 3/1953 | United Kingdom | 29/508 |

*Primary Examiner*—Randolph A. Reese
*Assistant Examiner*—Anthony Knight
*Attorney, Agent, or Firm*—Dority & Manning

[57] ABSTRACT

A pressurized fluid coupling and a method of manufacturing the pressurized fluid coupling are disclosed. The pressurized fluid coupling includes a metal tube having circumferentially extending beads formed therein for receiving a free end of a flexible tube thereon. The method of manufacturing the pressurized fluid coupling includes selectively hardening alternating wall portions of the metal tube by roll grooving spaced apart circumferentially extending grooves therein. After roll grooving the grooves into the tube, the tube is clamped in a clamping mechanism, and the end of the tube is subjected to an advancing punch mechanism which causes circumferentially extending bulges to form in the tube between the spaced apart grooves. The circumferentially beads add strength to the end of the tube for allowing a flexible hose to be compressedly secured thereto without collapsing the tube.

7 Claims, 3 Drawing Sheets

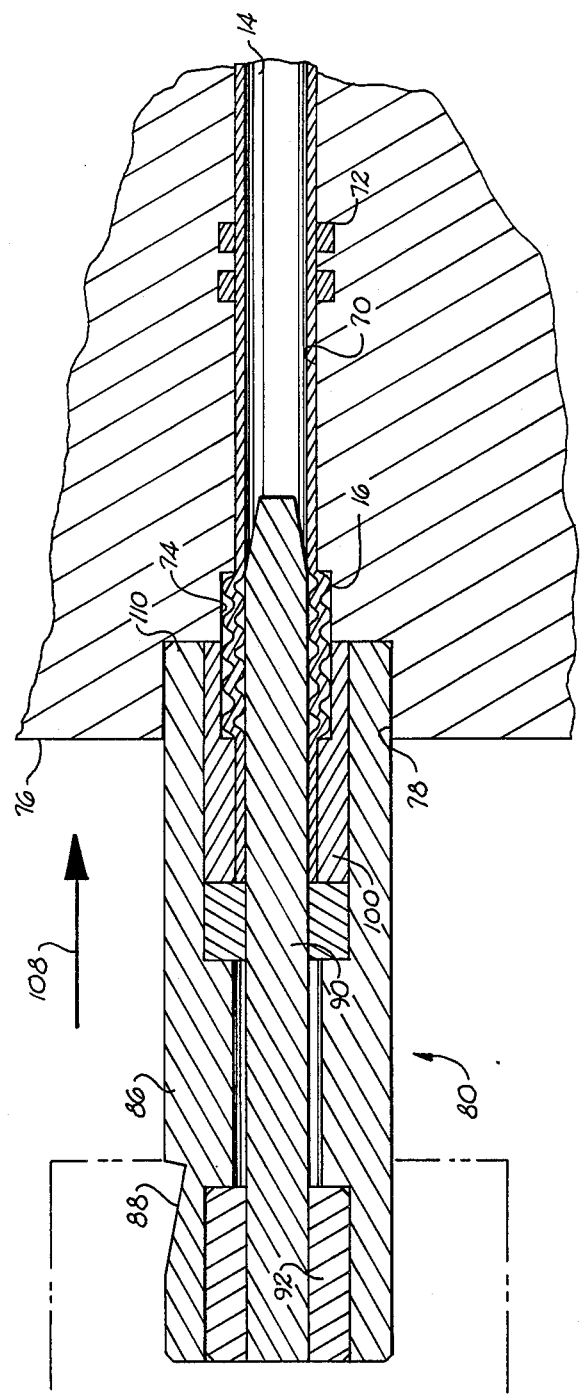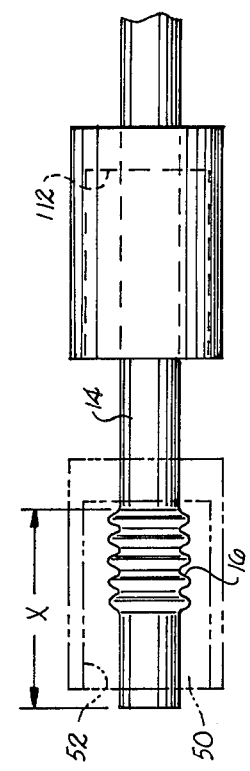
Fig. 5
Fig. 5a

4,773,679

PRESSURIZED FLUID COUPLING

BACKGROUND OF THE INVENTION

This invention relates to a pressurized fluid coupling which includes a metal tube having circumferentially extending beads formed therein for receiving a free end of a flexible tube thereon. This invention also relates to a method of manufacturing the pressurized fluid coupling of the present invention.

Pressurized fluid lines and couplings therefor are used throughout a variety of industries, such as in hydraulic equipment applications, refrigeration applications, compressed air applications, and the like. In the automotive industry, high pressure fluid lines and couplings are used in automotive air conditioning systems, braking systems, and power steering systems. The present invention deals primarily with pressurized fluid couplings for use in automotive power steering systems, although the present invention may find use in a variety of applications where there is transfer of pressurized fluid through conduits and hosing.

In an automotive power steering system, a power steering pump and steering gear box are provided wherein the power steering pump delivers pressurized fluid to the steering gear box to aid the driver in steering the vehicle. Typically, both the power steering pump and the steering gear box each include outwardly extending metal conduits or tubes. The ends of these tubes are connected to one another by flexible rubber hose. A metal sleeve is provided adjacent the end of each tube for receiving an end of the flexible hose, the sleeve being compressed or swaged inwardly upon receipt of the hose end to secure the hose end to the tube.

A problem arises in the swaging of the sleeves for fixing the hose ends to the tubes in that during the compression or swaging step, the ends of the metal tubes may become crimped or closed shut, thereby preventing proper operation of the power steering system.

One coupling has been developed which uses a sleeve member for being brazed to the end of a tube. The sleeve member has an inner cylindrical member which is in fluid communication with the tube. The sleeve member includes a housing spaced from the inner cylindrical member which forms an annular passage therebetween for receiving the end of a flexible hose. Upon receipt of the end of a flexible hose, the housing is swaged inward to fixedly secure the end of the flexible hose to the sleeve member.

Another type of pressurized fluid coupling includes the brazing of an outwardly ribbed cylindrical member to the end of the tube. The outwardly ribbed cylindrical member extends outwardly from the end of the tube and receives the end of a flexible hose about the ribbed surface thereof. A conventional cylindrical sleeve is placed about the end of the flexible hose and swaged inward to compress the end of the flexible hose against the ribbed cylindrical member for attaching the flexible hose to the end of the tube.

Still another type of pressurized fluid coupling includes a cylindrical insert member for insertion into the end of the tube to add strength to the end of the tube. The tube has grooves ground in an outer surface thereof for receiving the end of the flexible hose. This insert member is pressed into the end of the tube. A sleeve is placed about the end of the flexible hose and swaged inward to fix the flexible hose to the end of the tube.

The pressurized fluid couplings discussed above require for additional parts to be added to the ends of the tubes for receiving the end of a flexible hose. Additional parts are required for withstanding the compression forces generated during the swaging of the sleeve element about the end of the hose for retaining the end of the hose to the tube. Not only do these additional members add cost to the coupling, but also additional brazing and/or pressing steps are required for attaching the members to the ends of the tubes.

SUMMARY OF THE INVENTION

The present invention recognizes and addresses such drawbacks of the pressurized flexible coupling as discussed above. Hence, it is a general object of this invention to provide a pressurized fluid coupling which eliminates the requirement of an insert member or sleeve member for attaching the end of a flexible hose to a rigid tube.

Another object of the present invention to provide a pressurized fluid coupling which does not require brazing.

Another object of the present invention to provide a pressurized fluid coupling wherein the end of a rigid tube has been unitarily strengthened for resisting circumferential forces applied thereto.

Another object of the present invention is to provide a pressurized fluid coupling which uses readily available sleeves for receiving the end of a flexible hose.

Another object of the present invention is to provide a pressurized fluid coupling having a rigid tubular member with circumferentially extending beads formed thereon for strengthening the tube in the vicinity of the beads.

Another object of the present invention is to provide a pressurized coupling which utilizes standard size metal tubing.

Another object of the present invention is to provide a method for forming circumferentially extending beads in the wall of a rigid tube.

Yet another object of the present invention is to provide a method for selectively hardening spaced apart circumferentially extending portions on the outer surface of a rigid tube.

Various combinations of presently disclosed features may be provided in accordance with this invention in a given embodiment thereof. Generally, one such embodiment of the present invention includes a pressurized fluid coupling for an automotive power steering system. The pressurized fluid coupling includes a substantially cylindrical metal tube having a free end, the metal tube defining a fluid passageway therealong for carrying pressurized fluid, the metal tube further defining a plurality of first and second wall portions proximate the free end of the metal tube. The first wall portions are of lesser hardness than the second wall portions and are spaced side by side alternatingly therewith. Each of the first wall portions define a circumferentially extending bead thereat, the circumferentially extending beads being spaced apart and of unitary construction with the metal tube. Connection means are received about the first and second wall portions of the metal tube for receiving an end of the flexible hose and for securing same to the metal tube, to achieve fluid communication with the fluid passageway of the metal tube for accommodating fluid pressure associated with an automotive power steering system.

Yet another aspect of the present invention is directed to a method of manufacturing a pressurized fluid coupling for an automotive power steering system. The method comprises providing a substantially cylindrical metal tube and modifying the metal tube to define a plurality of alternating first and second wall portions in the metal tube. This includes selectively hardening the second wall portions to be of greater hardness than the first wall portions. The first and second wall portions are spaced side by side with respect to one another. The method further includes holding the metal tube outside of the first and second wall portions and applying a force to the metal tube adequate to cause each of the first wall portions to bulge radially outward with respect to the second wall portion, for providing the metal tube with a plurality of outwardly projecting, circumferentially extending, spaced apart beads. The beads provide in the vicinity thereof the metal tube with greater strength.

BRIEF DESCRIPTION OF THE DRAWINGS

The foregoing as well as other objects of the present invention will be more apparent from the following detailed description of a preferred embodiment of the invention, including best mode thereof, when taken together with the accompanying drawings, in which:

FIG. 5 is a partial sectional view of a grooved tube held in a jaw structure after having been compressed by a punch mechanism; and FIG. 5a is a partial side elevational view of a grooved tube after having been compressed by a punch mechanism for forming circumferentially extending beads thereon.

DESCRIPTION OF THE PREFERRED EMBODIMENT

Figure 1:
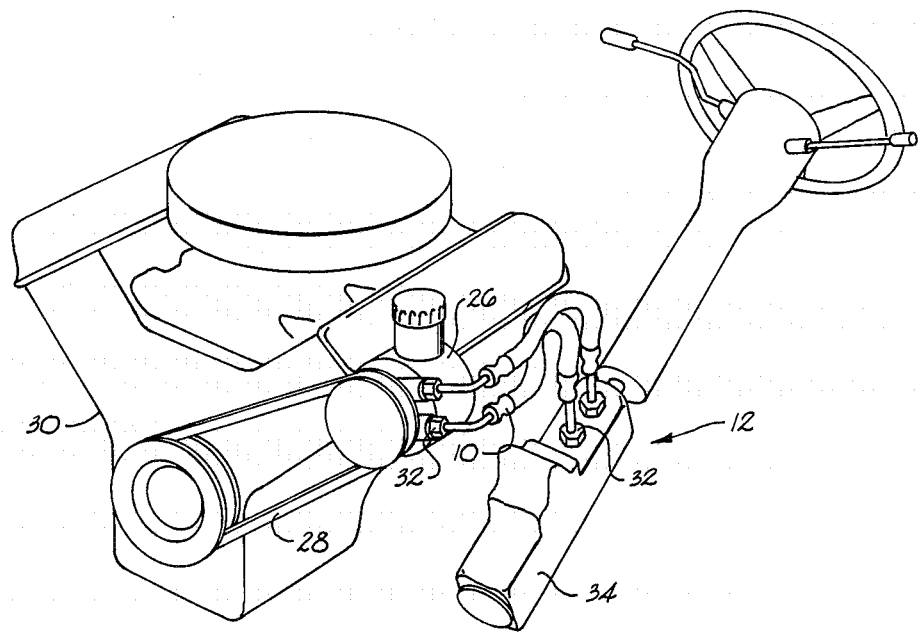
FIG. 1 is a perspective view of an automotive power steering system embodying pressurized fluid couplings constructed in accordance with the present invention.
Figure 2:
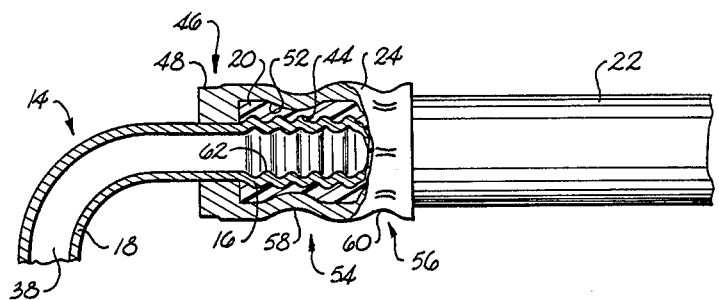
FIG. 2 is a side elevational view, with parts cut away, of a pressurized fluid coupling constructed in accordance with the present invention.

Referring to the drawings in detail, wherein like reference characters represent like elements and/or features throughout the various views, the pressurized fluid coupling of the present invention is designated generally in FIG. 1 by the reference character 10 as embodied in a conventional automotive power steering system 12. As best illustrated in FIG. 2, pressurized fluid coupling 10 includes a metal tube 14 having circumferential beads 16 provided in the wall 18 thereof, an end 20 of a flexible hose 22, and a compressible sleeve 24 attached to metal tube 14 for securing flexible hose 22 thereto.

The conventional automotive power steering system 12 includes a power steering pump 26 driven via a belt 28 by a conventional engine 30. Metal tubes 14 extend from power steering pump 26 and are connected thereto by conventional plug-in couplings 32. Metal tubes 14 also extend from a conventional power steering gear box 34 and are connected thereto by couplings 32.

Metal tube 14 is cylindrical and is preferably constructed of a mild steel, although any other suitable material could also be used. Metal tube 14 includes a free end 36, as illustrated in FIG. 3A, and a fluid passageway 38, for carrying pressurized fluid to and from power steering pump 26 and power steering gear box 34.

Figures 3A, 3B:
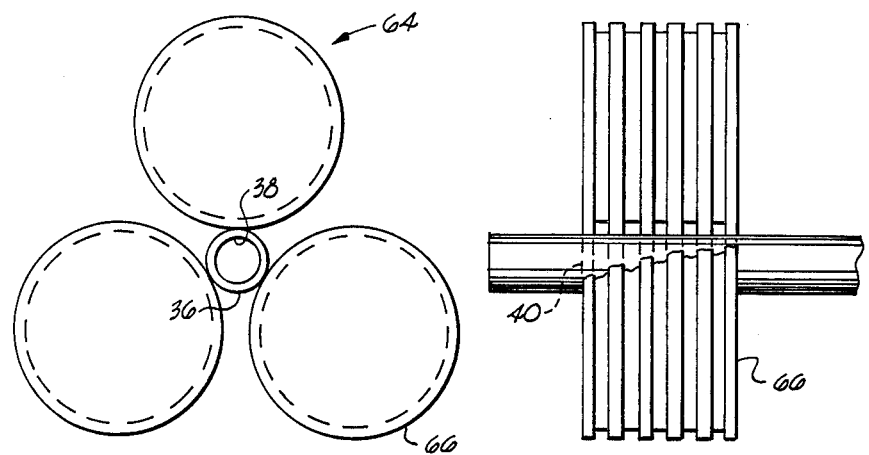
FIG. 3a is a side elevational view, with parts cut away, of grooved rollers rolling grooves into the surface of a tube.
FIG. 3b is a front elevational view illustrating three grooved rollers rolling grooves into a metal tube.

Circumferentially extending grooves 40 are roll grooved into wall 18 of metal tube 14, as shown in FIGS. 3a and 3b. The rolling in of grooves 40 hardens wall 18 of metal tube 14 where grooves 40 are rolled in. The rolling in of grooves 40 accordingly creates ringed wall portions 42 between grooves 40. Ringed wall portions 42 are of lesser hardness than grooves 40 in that ringed wall portions 42 have not been work hardened by roll grooving as have grooves 40. Roll grooving of grooves 40 into metal tube 14 actually compresses wall 18 where grooves 40 are rolled in. This is in contrast to the typical manner of forming grooves in tubes, which is done by machining and/or cutting processes, which actually remove metal from wall 18 to create grooves. By compressing and densifying wall 18 of metal tube 14 at grooves 40, alternating, spaced apart regions of differing hardness, signified by grooves 40 and ringed wall portions 42, are created adjacent free end 36 of metal tube 14. These alternating regions of differing hardness in metal tube 14 allow for circumferentially extending beads 16 to be formed in metal tube 14 in an accordion like manner upon application of a predetermined force to free end 36 of metal tube 14.

The provision of circumferentially extending beads 16 on metal tube 14 strengthens metal tube 14 in the vicinity thereof against radial compressive forces. Circumferentially extending beads 16 increase the strength of metal tube 14 to the point that the inserts and sleeve members of the prior art fluid couplings are no longer required. After formation of circumferentially extending beads 16 in metal tube 14, in a process to be hereinafter more fully described, sleeve 24 is positioned about beads 16, and a rear portion 46 of sleeve 24 is compressed or swaged inwardly at flats 48 to fix sleeve 24 to metal tube 14.

After sleeve 24 has been secured to metal tube 14, free end 20 of flexible hose 22 is inserted in the annular region 50 between an inner wall surface 52 of sleeve 24 and the exterior surfaces of beads 16 suc that the inner wall of flexible hose 22 contacts exterior surfaces of beads 16. After insertion of free end 20 of flexible hose 22 into annular region 50, medial portion 54 and forward portion 56 are compressed or swaged inwardly at depressions 58, 60, respectively, for retaining flexible hose 22 to metal tube 14. Flexible hose 22 is affixed to metal tube 14 such that a fluid passageway 44 of flexible hose 22 is in fluid communication with fluid passageway 38 of metal tube 14.

As discussed in more detail hereinafter, upon a predetermined pressure being provided on free end 36 of metal tube 14, ringed wall portions 42 will bulge outwardly with respect to grooves 40 to form beads 16, and portions 62 of wall 18 of metal tube 14 beneath grooves 40 will bulge radially inwardly into fluid passageway 38 of metal tube 14 to form interior beads at portions 62, to give metal tube 14 a corrugated effect, as shown in FIGS. 2 and 5.

The present invention is also drawn to a method of manufacturing pressurized fluid coupling 10 for automotive power steering system 12. As illustrated in FIGS. 3a and 3b, the method includes providing a metal tube 14 having a relatively smooth, non-grooved surface to a roll grooving arrangement 64 having three grooved rollers 66 spaced equidistantly about the circumference of metal tube 14. Such a grooved roller arrangement is manufactured by Manchester Tool and Die Company of North Manchester, Ind.

Upon placement of grooved rollers 66 about metal tube 14, grooved rollers 66 rotate to compressedly roll grooves 40 into metal tube 14. The rolling in of grooves 40 into metal tube 14 work hardens and densifies wall 18 of metal tube 14 in the vicinity of grooves 40 such that the hardness of wall 18 thereabouts is greater than the hardness of wall 18 about ringed wall portions 42.

After rolling in of grooves 40 around metal tube 14, a sleeve 24 is placed upon metal tube 14, spaced from where grooves 40 have been rolled into metal tube 14.

Metal tube 14, having grooves 40 formed therein, is then inserted into a clamping jaw mechanism 68 which grips metal tube 14 between grooves 40 and where sleeve 24 is carried thereon. Clamping jaw mechanism 68 includes, as illustrated in FIG. 5, a central bore 70 provided therealong for receiving metal tube 14. Serrated gripping members 72 are provided adjacent central bore 70 for gripping into the exterior surface of metal tube 14 for retaining metal tube 14 to clamping jaw mechanism 68. One such clamping jaw mechanism is manufactured by Manchester Tool and Die Company of North Manchester, Ind.

Communicating with central bore 70 of clamping jaw mechanism 68 is a counterbore portion 74. Communicating with counterbore portion 74 and a forward face 76 of clamping jaw mechanism 68 is a cavity portion 78. Metal tube 14 is positioned in clamping jaw mechanism 68 such that free end 36 of metal tube 14 extends outwardly through counterbore portion 74 and cavity portion 78 and away from forward face 76 of clamping jaw mechanism 68.

Figure 4:
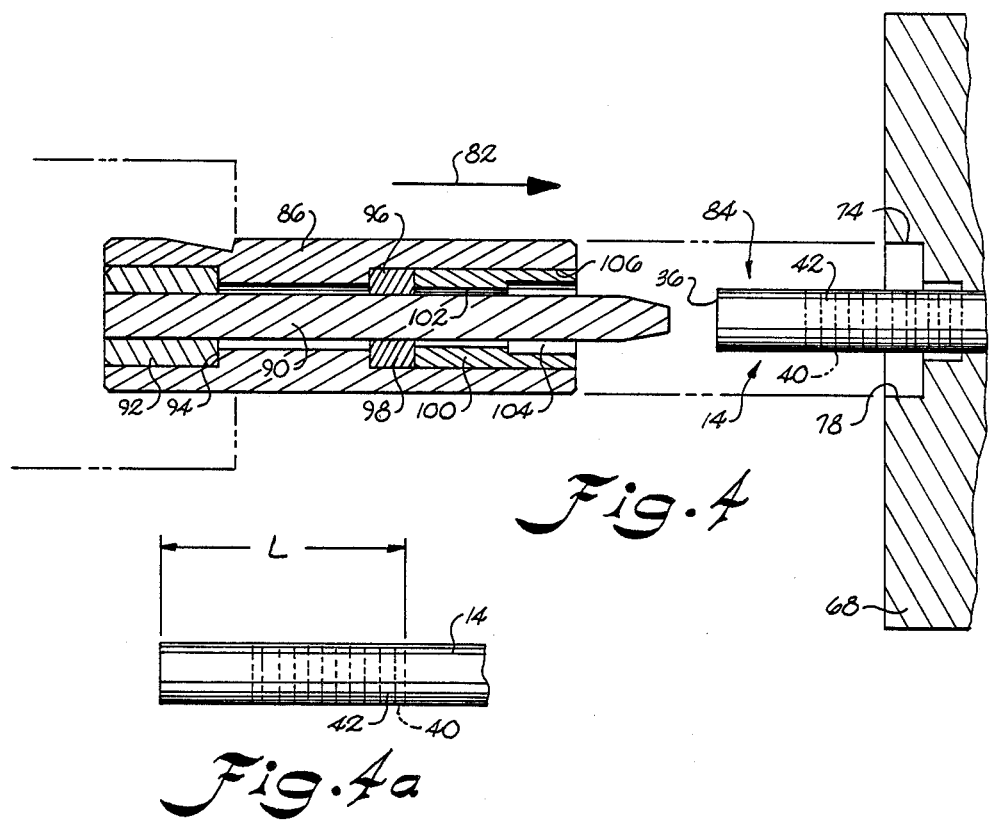
FIG. 4 is a partial sectional view of a grooved tube held in a jaw prior to being compressed by a punch mechanism.

Upon metal tube 14 being situated in clamping jaw mechanism 68, as illustrated in FIG. 4, a punch mechanism 80 is brought forward, in the direction shown by arrow 82, to apply a force to free end 36 of metal tube 14 sufficient for causing the outward end 84 of metal tube 14 to become compressed, thereby forming beads 16.

Punch mechanism 80 includes a body member 86 having a notched portion 88 for engagement with a ram of a hydraulic machine, such as that manufactured by Manchester Tool and Die Company, of North Manchester Ind. Body member 86 carries therein an outwardly projecting pin 90 having a head 92 which engages a shoulder 94 of body member 86.

Pin 90 is inserted into fluid passageway 38 of metal tube 14 upon contact of metal tube 14 by punch mechanism 80. Pin 90 restrains portions 62 of metal tube 14 under grooves 40 from bulging inwardly into fluid passageway 38 past a predetermined distance, upon compression by punch mechanism 80 of metal tube 14.

Also carried within body member 86 is a ring member 96 which is situated perpendicularly in body member 86 and which rests against a shoulder 98 of body member 86 and against a rearward surface of a socket member 100. Socket member 100 includes a central bore 102 for receiving pin 90 and also includes a counterbore 104 in communication with central bore 102 and a forward face 106.

Upon advancement of punch mechanism 80 in the direction of arrow 108 shown in FIG. 5, outward end 84 of metal tube 14 is compressed, thereby forming the beads 16.

As illustrated in FIG. 5, a forward edge 110 of body member 86 and forward face 106 of socket rim 100 are received in cavity portion 78 of clamping jaw mechanism 68, upon advancement of punch mechanism 80 to its fullest extent. Also, when punch mechanism 80 advances to its fullest extent, beads 16 form in a predetermined manner such that two beads form within counterbore portion 74 of clamping jaw mechanism 68 and three beads 16 form in counterbore 104 of socket member 100. Beads 16 are restrained from bulging outwardly past a predetermined distance by the inner surfaces of counterbore portion 74 and counterbore 104. Portions 62 under grooves 40 are prevented from bulging radially inwardly past a predetermined distance by pin 90.

Figure 4A:
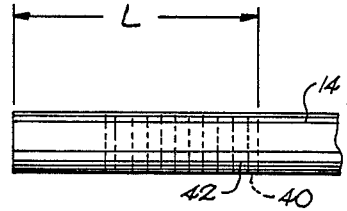
FIG. 4a is a partial side elevational view of a tube grooved in accordance with the present invention.

After punch mechanism 80 has advanced into clamping jaw mechanism 68 to form beads 16, punch mechanism 80 is retracted and clamping jaw member 68 actuated to release metal tube 14. After the compression of outward end 84 of metal tube 14, the former length of outward end 84, illustrated as L in FIG. 4a, which is typically 1 inch, has been reduced to the length of X, as illustrated in FIG. 5a, which is typically three-quarters of an inch.

After metal tube 14 is removed from clamping jaw mechanism 68, sleeve 24 is moved to encompass beads 16, and rear portion 46 of sleeve 24 is swaged to secure sleeve 24 to metal tube 14.

Free end 20 of flexible hose 22 is then inserted over beads 16 and within sleeve 24 until free end 20 of flexible hose 22 is adjacent rear wall 112 of sleeve 24. Medial portion 54 and forward portion 56 of sleeve 24 are then swaged inwardly in a conventional manner to fix sleeve 24 to flexible hose 22, and accordingly, flexible hose 22 to metal tube 14, thereby forming pressurized fluid coupling 10.

EXAMPLE

In one embodiment of the present invention, certain dimensions and parameters have been found to yield desirable results. Several of these dimensions and parameters are discussed as follows.

Metal tube 14 is preferably constructed of S131 steel tubing and has an outside diameter of 0.375 inches and an inside diameter of 0.360 inches. The width of grooves 40 rolled into metal tube 14 are preferably 0.030 inches wide. The width of ringed wall portions 42 are preferably 0.125 inches. The depth of grooves 40 is preferably 0.0075 inches.

During the compression process, wherein outward end 84 of metal tube 14 is compressed to form beads 16, a force of approximately 700 pounds is applied by punch mechanism 80 to free end 36 of metal tube 14.

After formation of beads 16 in metal tube 14, the outside diameter of beads 16 should vary between 0.411 and 0.421 inches. The inward projection of portions 62 should not project inwardly so as to produce an inner diameter of metal tube 14 less than 0.261 inches. The length of metal tube 14 from free end 36 to the first groove 40 defined in metal tube 14 should be 0.625 inches.

While a preferred embodiment and method of manufacturing have been described using specific terms regarding the present invention, such descriptions are for present illustrative purposes only, and it is to be understood that changes and variations to such embodiment and method, including but not limited to the substitution of equivalent steps, features or parts, and the reversal of various features thereof, may be practiced by those of ordinary skill in the art without departing from the spirit or scope of the following claims.

What is claimed is:

1. A coupling for providing a pressurized fluid connection to a flexible hose of an automotive power steering system, the coupling comprising:
    a substantially cylindrical metal tube having a free end, said metal tube defining a fluid passageway therealong for carrying pressurized fluid, said metal tube further defining a plurality of first and second wall portions proximate said free end; said second wall portions including circumferentially extending grooves compressed therein; said second wall portions being of greater hardness and density than said first wall portions and spaced side by side alternatingly therewith;
    each of said first wall portions defining a circumferentially extending bead thereat, said circumferentially extending beads being spaced apart and of unitary construction with said metal tube; and
    connection means received about said first and second wall portions of said metal tube for receiving an end of a flexible hose, said connection means securing the end of a flexible hose to said metal tube to achieve fluid communication with said fluid passageway of said metal tube for accommodating fluid pressure associated with an automotive power steering system.

2. A coupling as defined in claim 1, wherein said metal tube is steel.

3. A coupling as defined in claim 1, wherein said connection means is a sleeve having an opening adapted for receiving an end of a flexible hose, said sleeve being compressible inwardly for securing the free end of a flexible hose receivable in said opening to said metal tube.

4. A coupling as defined in claim 1, further comprising at least one of said circumferentially extending grooves being provided between each of said circumferentially extending beads.

5. A coupling as defined in claim 1, further comprising each of said second wall portions defining a circumferentially extending interior bead projecting inwardly into said fluid passageway of said metal tube.

6. A pressurized fluid coupling for an automotive power steering system, the pressurized fluid coupling comprising:
    a substantially cylindrical metal tube having a free end, said metal tube defining a fluid passageway for carrying pressurized fluid, said metal tube further defining a plurality of first and second wall portions proximate said free end; said first wall portions being of lesser hardness and density than said second wall portions and spaced side by side alternatingly therewith;
    each of said first wall portions defining a circumferentially extending bead being spaced apart and of unitary construction with said metal tube;
    each of said second wall portions including a circumferentially extending groove compressed therein between each of said circumferentially extending beads;
    a flexible tube having a free end, said flexible tube defining a fluid passageway for carrying pressurized fluid; and
    a sleeve secured to said metal tube adjacent said free end of said metal tube, said sleeve having an opening in which said free end of said flexible tube is received, said sleeve being swaged inwardly for securing said free end of said flexible tube proximate said free end of said metal tube, for achieving fluid communication between said fluid passageway of said metal tube and said fluid passageway of said flexible tube for accommodating fluid pressure associated with an automotive power steering system.

7. A pressurized fluid coupling, comprising:
    a substantially cylindrical metal tube having a free end, said metal tube defining a fluid passageway therealong for carrying pressurized fluid, said metal tube further defining a plurality of first and second wall portions proximate said free end; said second wall portions including circumferentially extending grooves compressed therein; said second wall portions being of greater hardness and density than said first wall portions and spaced side by side alternatingly therewith;
    each of said first wall portions defining a circumferentially extending bead thereat, said circumferentially extending beads being spaced apart and of unitary construction with said metal tube; and
    connection means received about said first and second wall portions of said metal tube for receiving an end of a flexible hose, said connection means securing the end of a flexible hose to said metal tube to achieve fluid communication with said fluid passageway of said metal tube for accommodating fluid pressure associated therewith.

* * * * *